(12) United States Patent
Masson et al.

(10) Patent No.: US 10,691,728 B1
(45) Date of Patent: Jun. 23, 2020

(54) TRANSFORMING A DATA STREAM INTO STRUCTURED DATA

(71) Applicant: Datadog, Inc., New York, NY (US)

(72) Inventors: Charles-Philippe Masson, Paris (FR); Stephen Paul Kappel, Plainview, NY (US)

(73) Assignee: Datadog, Inc., New York, NY (US)

(*) Notice: Subject to any disclaimer, the term of this patent is extended or adjusted under 35 U.S.C. 154(b) by 0 days.

(21) Appl. No.: 16/539,861

(22) Filed: Aug. 13, 2019

(51) Int. Cl.
G06F 16/00 (2019.01)
G06F 16/28 (2019.01)

(52) U.S. Cl.
CPC .................... G06F 16/285 (2019.01)

(58) Field of Classification Search
CPC .................................................. G06F 16/285
USPC ......................................................... 707/737
See application file for complete search history.

(56) References Cited

U.S. PATENT DOCUMENTS

| | | | | |
|---|---|---|---|---|
| 5,890,154 A * | 3/1999 | Hsiao | ........................ | G06F 16/00 |
| 8,380,758 B1 * | 2/2013 | Stephens | ............. | G06F 9/45512 370/392 |
| 8,577,829 B2 * | 11/2013 | Subrahmanyam | ..... | G06N 7/005 706/52 |
| 8,620,928 B1 * | 12/2013 | Walton | .................... | G06F 40/16 707/748 |
| 9,589,183 B2 * | 3/2017 | Brown | .................. | G06F 40/205 |
| 9,600,479 B2 * | 3/2017 | Motoyama | .............. | G06F 16/93 |
| 9,626,414 B2 * | 4/2017 | Kanjirathinkal | .. | G06F 16/24578 |
| 10,205,627 B2 * | 2/2019 | Kushmerick | ........ | H04L 41/0613 |
| 2006/0184529 A1 * | 8/2006 | Berg | .................... | G06F 11/0709 |
| 2008/0147588 A1 * | 6/2008 | Leffingwell | ........... | G06F 16/951 706/48 |
| 2009/0327256 A1 * | 12/2009 | Paparizos | .............. | G06F 40/211 |
| 2009/0327269 A1 * | 12/2009 | Paparizos | ........... | G06F 16/3322 |
| 2011/0185234 A1 * | 7/2011 | Cohen | ................. | G06F 11/3476 714/37 |
| 2012/0323921 A1 * | 12/2012 | Chen | ..................... | G06F 16/313 707/740 |
| 2014/0006010 A1 * | 1/2014 | Nor | ........................ | G06F 40/211 704/9 |
| 2014/0325254 A1 * | 10/2014 | Mani | ..................... | G06F 16/285 714/2 |
| 2015/0220605 A1 * | 8/2015 | Syed | ....................... | G06F 17/40 707/776 |
| 2016/0104002 A1 * | 4/2016 | Schneider | ............. | G06F 16/254 726/1 |

(Continued)

*Primary Examiner* — Thanh-Ha Dang
(74) *Attorney, Agent, or Firm* — Fish & Richardson P.C.

(57) ABSTRACT

A method for processing a data stream to identify a structure of the data stream includes receiving the data stream a sequence of characters, retrieving a set of rules for encoding characters into at least one token, and parsing the data stream. Parsing includes generating a plurality of tokens according to the set of rules. Each token represents a corresponding portion of the sequence of characters. Parsing includes forming a sequence of tokens from the plurality of tokens and assigning at least one attribute value describing the corresponding portion of the sequence of characters of the corresponding token to which the attribute value is assigned. The sequence of tokens are assigned to a cluster by determining that the sequence of tokens matches a pattern by which the cluster is characterized. The sequence of tokens is merged with the cluster. A representation of the cluster is output.

20 Claims, 10 Drawing Sheets

(56) References Cited

U.S. PATENT DOCUMENTS

| | | | | |
|---|---|---|---|---|
| 2016/0104003 A1* | 4/2016 | Schneider | ............ | G06F 16/254 |
| | | | | 726/1 |
| 2017/0357710 A1* | 12/2017 | Shtossel | ................ | G06F 16/355 |
| 2018/0046697 A1* | 2/2018 | Maciolek | ............... | G06F 16/285 |
| 2018/0102938 A1* | 4/2018 | Yoon | ........................ | G06F 11/30 |
| 2018/0307576 A1* | 10/2018 | Debnath | ................ | G06F 11/34 |
| 2018/0314835 A1* | 11/2018 | Dodson | ................ | G06F 21/577 |

* cited by examiner

TRANSFORMING A DATA STREAM INTO STRUCTURED DATA

TECHNICAL FIELD

The present disclosure relates to identifying structure in a data stream to transform the data stream into structured data. More specifically, this disclosure relates to tokenizing log messages and clustering the tokenized log messages to represent patterns in the log messages.

BACKGROUND

Computer systems can be used to transmit, receive, and/or process data. For instance, a server computer system can be used to receive and store resources (e.g., web content, such as a webpage), and make the content available to one or more client computer systems. Upon receiving a request for the content from a client computer system, the server computer system can retrieve the requested content, and transmit the content to the client computer system to fulfill the request.

Computer systems can be configured to monitor operations and provide data representing those operations as a response to a request for data. The data representing those operations can be in the form of data logs.

SUMMARY

The systems and methods described in this document are configured to receive a data stream including data entries (e.g., log messages) that are provided by at least one computing system and transform the data stream into a structured representation that can be queried by at least one computing system. The systems and methods are configured to receive a data stream (e.g., a sequence of characters) from at least one computing system, parse the data stream to determine the contents of the data entries, and transform the data stream into structured data that includes metadata describing the data entries. The systems and methods are configured to use the metadata to cluster the logs according to at least one metric, respond to queries about the logs, output data about the logs, and so forth.

Implementations of the subject matter described herein can provide various technical benefits. Generally, a computing system that monitors the behavior of at least one other computing system (or itself) receives a data stream (e.g., log data) that includes information representing the operation of computing system(s) being monitored. Generally, the data stream includes mostly repetitive data that provides information about the nominal operations of the computing system. A relatively small portion of the data stream can include data indicative of an anomaly in the operations of the computing system.

However, rather than discard the majority of the data stream indicating nominal operation, it may be useful to interpret portions of the data stream indicating anomalous operation of the computing system in the context of the rest of the data stream. It may be useful to structure the data stream so that the computing system can perform analyses on the data stream, respond to queries about the data stream, and so forth. Additionally, it may be useful to reduce the size of the data stream and store information about the data stream to provide a manageable amount of data for review by a system operator. For example, in circumstances in which large portions of the data stream include semi-redundant data that may differ only in unimportant ways (e.g., common log messages with different dates), it may be desirable to store only data about the semi-redundant data (such as how many messages were received) rather than the semi-redundant data itself.

However, it can be difficult to determine how to compress the data stream into a smaller representation, as each data entry can be unique (e.g., have a unique time stamp, etc.). It is not straightforward to simply combine identical data entries or similar data entries of the data stream, because while the data entries may include similar building blocks of information (e.g., have similar structure), the values of the building blocks can be entirely different. For example, two log messages can report that a first host and a second host responded to a service request without fault. It may be desirable to combine this into a representation indicating that the service is responding properly, but the varying time stamps and host identifiers in the data entries can cause the log messages to appear (facially) to be very different. It can also be difficult to identify what the building blocks of the data stream are.

To compress the data stream, the computing system determines what data should be preserved in the compressed representation of the data stream, and what data can be discarded, so that the compressed representation is still representative of the behavior of the computing system. For example, a structure of log messages can be retained by tokenizing the log message without saving the details of what is in the log message. In the above example, it can be desirable to show that the service responded to two requests without fault, but it might not be necessary to preserve the particular hostname that was associated with the response. It might also be unnecessary to preserve the time stamp associated with each message (once the data representing the time stamp is identified as being a time stamp).

To overcome the above problems and achieve these solutions, for example, the systems described herein are configured to transform the data stream, such as log data that is received by a computing system, into structured data including building blocks (e.g., tokens) that are identified in the data stream. The building blocks of the structured data are identified by parsing the data stream and determining which portions of the data stream are redundant or semi-redundant. The structured data includes metadata that enables the computing system to respond to queries about the data stream. For example, the computing system can be configured to parse received log messages to generate at least one token representing each log message. Each of the tokens are associated with metadata that describes the token.

The computing system can reduce the size of the data stream by merging portions of the data stream (e.g., clustering log messages of the data stream into data clusters). For example, log messages represented by similar or identical groups of tokens can be clustered together. The computing system can respond to queries for log messages including particular tokens, display clusters of log messages, etc. The computing system can thus output data (e.g., a list of log message clusters) that can assist an operator with identifying anomalies of the computing system. For example, a record of thousands or even millions of log messages can be compressed into hundreds or tens of clusters that represent the operations of the computing system. The cluster representation of the log messages removes redundant data that does not provide additional insight into the operations of the computing system while preserving data that can be indicative of anomalies or other interesting behavior of the computing system.

In an aspect, a process for processing a data stream to identify a structure of the data stream includes receiving the data stream including at least one log message, each log message including a sequence of characters. The process includes retrieving, from a data storage, a set of rules for encoding log message characters into at least one token. The process includes parsing the at least one log message as the at least one log message is received. Generally, parsing includes generating a plurality of tokens according to at least one rule of the set of rules. In some implementations, each token represents a corresponding portion of the sequence of characters of the at least one log message. The parsing includes forming a sequence of tokens from the plurality of tokens. The parsing includes assigning, to at least one token of the sequence of tokens, at least one attribute value describing the corresponding portion of the sequence of characters of the corresponding token to which the attribute value is assigned. The process includes assigning the sequence of tokens to a cluster. Generally, assigning the sequence of tokens to the cluster includes determining that the sequence of tokens matches a pattern by which the cluster is characterized. The clustering includes merging the sequence of tokens with the cluster. The process includes outputting a representation of the cluster including the sequence of tokens included in the cluster. Generally, the cluster is indicative of a structure of at least a portion of the data stream.

In some implementations, the process includes determining that at least the portion of the sequence of characters represented by a token of the sequence of tokens includes a variable having a predetermined type. The process includes assigning an attribute value to the token indicating the type of the variable.

In an aspect, the set of rules includes a graph including nodes and edges. Parsing the at least one log message includes initializing a position in the graph at a root node of the nodes, and for successive characters of the log message, traversing the graph from the root node along a path of the nodes and the edges until an end node is reached. The end node represents a particular token. The process includes encoding each character represented by the path of the nodes and the edges into the particular token represented by the end node.

In some implementations, the set of rules includes a lookup table including at least one entry. The at least one entry includes a mapping between a particular sequence of characters and a particular token. Parsing the at least one log message includes determining that at least a portion of the sequence of characters of the log message matches the particular sequence of characters of an entry of the lookup table, and encoding at least the portion of the sequence of characters as the particular token.

In some implementations, determining that the sequence of tokens matches a pattern by which the cluster is characterized includes determining that the sequence of tokens and the cluster each include a same number of tokens and determining that the sequence of tokens and the cluster each include mergeable attribute values in a same order.

In some implementations, assigning the sequence of tokens to the cluster includes determining that the sequence of tokens comprises a particular token at a particular position in the sequence of tokens, determining that the cluster comprises an unmergeable token at the particular position in the cluster, and sorting, in response to the determining, the sequence of tokens into a different cluster regardless of remaining tokens of the sequence of tokens.

In an aspect, an attribute value represents a category of the sequence of characters represented by the token, the category including one of a key value, a date, an index, a query, an error code, an error message, and a variable value.

In an aspect, the representation further includes a list of each cluster generated from the data stream, the list including the representation of the cluster. In some implementations, the list of each cluster generated from the data stream is ordered based on a count value associated with each cluster.

In an aspect, outputting the representation of the cluster is responsive to receiving a request for the representation of the cluster from a client device. For example, at least one token of the representation of the cluster is represented as a code word or code symbol, the code word or code symbol being selected based on an attribute value associated with the at least one token.

In some implementations, a token of the plurality of tokens represents a variable having a first value. The token is configured to be merged with a corresponding token of the cluster representing the variable having a second value, the first value being different from the second value.

In an aspect, a computing system for obtaining performance metrics for one or more computing devices includes a parsing module and a clustering module. The parsing module is configured for performing operations including receiving the data stream comprising at least one log message, each log message comprising a sequence of characters, and retrieving, from a data storage, a set of rules for encoding log message characters into at least one token. Parsing the at least one log message as the at least one log message is received, wherein parsing includes generating a plurality of tokens according to at least one rule of the set of rules. Each token represents a corresponding portion of the sequence of characters of the at least one log message, and forming a sequence of tokens from the plurality of tokens. Parsing includes assigning, to at least one token of the sequence of tokens, at least one attribute value describing the corresponding portion of the sequence of characters of the corresponding token to which the attribute value is assigned. The clustering module is configured to perform operations including assigning the sequence of tokens to a cluster. Assigning the sequence of tokens to the cluster includes determining that the sequence of tokens matches a pattern by which the cluster is characterized, and merging the sequence of tokens with the cluster. The computing system is configured to output a representation of the cluster comprising the sequence of tokens included in the cluster, the cluster indicative of a structure of at least a portion of the data stream.

In an aspect, one or more non-transitory computer readable media storing instructions that are executable by one or more processors configured to perform operations for processing a data stream to identify a structure of the data stream. The operations include receiving the data stream including at least one log message, each log message including a sequence of characters. The operations include retrieving, from a data storage, a set of rules for encoding log message characters into at least one token. The operations include parsing the at least one log message as the at least one log message is received. Generally, parsing includes generating a plurality of tokens according to at least one rule of the set of rules. In some implementations, each token represents a corresponding portion of the sequence of characters of the at least one log message. The parsing includes forming a sequence of tokens from the plurality of tokens. The parsing includes assigning, to at least one token of the sequence of tokens, at least one attribute value describing the corresponding portion of the sequence of characters of the corresponding token to which the attribute value is assigned. The operations include assigning the sequence of tokens to a cluster. Generally, assigning the sequence of tokens to the cluster includes determining that the sequence of tokens matches a pattern by which the cluster is characterized. The clustering includes merging the sequence of tokens with the cluster. The operations include outputting a representation of the cluster including the sequence of tokens included in the cluster. Generally, the cluster is indicative of a structure of at least a portion of the data stream The details of one or more embodiments are set forth in the accompanying drawings and the description below. Other features and advantages will be apparent from the description and drawings, and from the claims.

DETAILED DESCRIPTION

The present disclosure describes a computing system that is configured to transform a data stream (e.g., of ASCII characters or similar characters) into structured data including attributes and attribute values. The computing system is configured to receive a data entry (e.g., a string of characters) that is discrete from other data entries in the data stream. For example, the data entry can include a log message. The data stream generally includes a plurality of data entries that are similar in content but that may differ slightly. In other words, the data entries generally include the same building blocks of characters, but can be different (or even unique) from other data entries received by the computing system.

The computing system is configured to transform a data entry of the data stream into at least one token. The tokens (described in relation to FIG. 1) each represent a portion of the data entry and can be associated with metadata, such as attributes and attribute values. The tokens are the building blocks for each data entry. Once a data entry is transformed into at least one token, it is called a tokenized data entry.

The computing system is configured to group tokenized data entries that include the same tokens as one another into clusters of data entries. Clustering the data entries enables the computing system to represent the data stream using a reduced amount of data (e.g., up to orders of magnitude less data). The computing system can show the most unique data entries of the data stream, which may be of increased importance to a system operator, relative to more common data entries that are less unique. Thus, structuring the data of the data stream can assist monitoring systems (and their operators) in identifying operational anomalies in the computing system and therefore enable operators of the computing system to take corrective actions to remedy the anomalies.

Figure 1:
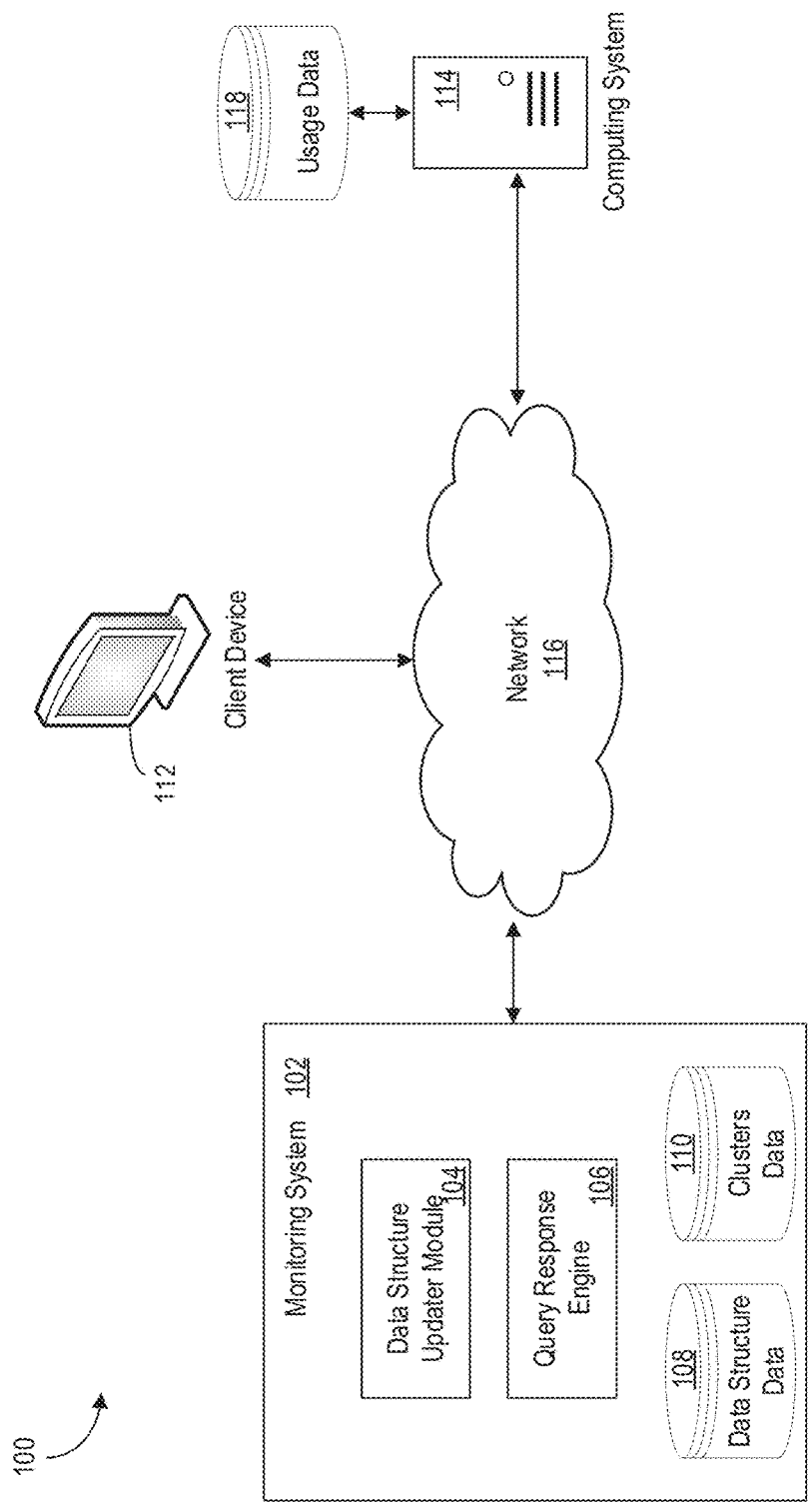
FIG. 1 is a diagram of an example computing environment for the computing system for transforming a data stream into structured data.

FIG. 1 is a diagram of an example computing environment 100 for transforming data of a data stream into structured data. The computing environment 100 includes a monitoring system 102 configured to receive a data stream from a computing system 114. The computing environment 100 includes a client device 112 configured to send one or more requests for data from the monitoring system 102 and/or the computing system 114. The client device 112 can access the monitoring system 102 over a network 116 (e.g., the Internet). The monitoring system 102 is configured to receive a data stream that is generated by the computing system 114. The monitoring system 102 transforms the data stream into structured data, including metadata. The structured data that is generated by the monitoring system 102 can be accessed by the client device 112 (e.g., in response to a user query) and presented to a user by a user interface (not shown) of the client device. Each component of the computing environment is subsequently described in additional detail.

A data stream includes a string of characters, such as ASCII characters. The data stream can be configured to be intermittently (or in some cases, continuously) sent from the computing system 114 to the monitoring system 102 for ingestion by the monitoring system 102. The monitoring system 102 receives the data stream, ingests the data stream (e.g., processes the characters of the data stream), and performs tokenizing and clustering operations on the data stream, as subsequently described. The data stream can be a continuous string of characters or can be segmented into data entries or data elements. The data stream can form one or more data entries 118 that are each sent by the computing system 114 to the monitoring system 102 in sequence. The data entries 118 are each generated individually and wholly (e.g., no partial data entries are generated). For example, each data entry 118 can include a log message. The log message is generated by the computing system 114 in its entirety before being stored in a database of data entries and/or sent to the monitoring system 102 for processing. Log messages are described in detail with respect to FIG. 2, and generally include a description of an operation of the computing system 114, details about the computing system 114 hardware or software (or both), and/or one or more other attributes that are descriptive of the log message itself (e.g., a data and time of when the log message was generated by the computing system 114). Data entries 118 can be received by the monitoring system 102 as a data stream, and so the monitoring system can use portions of the data entries (e.g., a time stamp or syntax characters) to determine when a first data entry is complete and a second data entry commences.

The monitoring system 102 generally includes at least one computing system that is configured to monitor computing operations of a computer or computer network. The monitoring system 102 can monitor the operations of a computing system (e.g., computing system 114) that generates a data stream describing operations of that computing system 114. For example, the monitoring system 102 can be configured to monitor how the computing system 114 responds to requests for data from one or more services of the computing system 114, how the computing system 114 processes data, what errors occur during this processing, and so forth. Generally, the operations can include any function performed by the computing system 114. In some implementations, the computing system 114 includes the monitoring system 102. For example, the monitoring system 102 can include a software suite that is installed on the computing system 114. In some implementations, the monitoring system 102 is configured to monitor the operations of a plurality of computing systems that are similar to computing system 114. In such a configuration, the monitoring system 102 can identify the particular source of a data stream by a host name or other identifier. The monitoring system 102 receives the data stream from the computing system 114, transforms the data stream into structured data, and responds to queries about the operational behavior of the computing system 114.

The monitoring system 102 includes a parsing module 104 and a clustering module 106. The parsing module 104 of the computing system 102 is configured to scan (e.g., ingest character by character) data of the data stream and generate tokens representing data entries of the data stream as tokenized data elements. The clustering module 106 is configured to cluster (e.g., merge) tokenized data elements to one another into a group. The clustering can be based on one or both of the tokens of the tokenized data element and the metadata (e.g., attribute types and attribute values) associated with the tokenized data element. Generally, the clustering module 106 merges token sequences together when the sequence of tokens in each token sequence either exactly matches or conforms to at least one merging rule, subsequently described.

A token includes a unit of the data stream which is a building block of the data stream as determined by the monitoring system 102. A tokens is associated with metadata indicative of a type of the token and/or a value of the token, when applicable. A token can include a single character (e.g., a punctuation symbol of the data stream). A token generally includes a group of sequential characters in the data stream. Tokens of the data stream can be different from one another. Tokens of a data entry of the data stream (e.g., a log message) can be associated with one another (e.g., grouped together). Tokens are generated by the parsing module 104 as described in detail in relation to FIGS. 2-4. Generally, the content of tokens of a data stream is based on what the data stream includes. The parsing module 104 includes logic for parsing tokens from the data stream. The logic can be predefined, determined dynamically based on the stream of data being received, or a combination of the two.

The metadata that is associated with each token includes a description of the data represented by the token. The metadata indicates a type of the token, which can be relevant to the particular data stream being transformed by the monitoring system 102. For example, the metadata indicating the type of a token can indicate that the token represents a time stamp (e.g., date), a host name (e.g., particular computing system 114 that responded to a request for data by the client device 112), a service name (e.g., a service responding to the request for data by the client device), an error message type, a punctuation type, a formatting regime used for the data stream, tag identities, a source name, and so forth.

The values of the metadata of a token are referred to as the attributes of the token. The attributes of the token can include a token type and a token value. For example, some tokens can represent keys of the structured data, while other tokens can represent values of the keys. For example, metadata can indicate that a token type is a time stamp, while the value can include the value of the time stamp. Not every token includes a value. In some implementations, the value of a token is not considered useful by the monitoring system 102 for monitoring operational behavior of the computing system 114. In this case, the value of the data included in the token can be discarded. For example, it might be relevant that the data stream includes a time stamp, which may indicate that a new log message is received. However, the actual time represented in the time stamp may not be necessary for monitoring purposes. The monitoring system 102 tokenizes the portion of the data sequence including the time stamp as a token that can be merged with other tokens representing time stamp data, without regard to the value of the data in the time stamp.

Alternatively, or in addition, a token can include syntax of the data stream, and the metadata can indicate that a token includes the syntax. In some implementations the metadata includes data indicating an operative function of the syntax included in the token. This can be useful for determining whether two data entries of the data stream can be merged, or whether the data entries have different structures and cannot be merged. Tokenizing is described in detail in relation to FIGS. 2-4.

The parsing module 104 is configured to transform the unstructured data entries 118 (e.g., log messages) into lists of tokens. This transformation can be referred to as tokenization of the data entry in this disclosure. The tokens that are generated for each data entry 118 represent the structure of the content of the data entry. The data entry itself (and the data stream) is not structured data, but generally an unstructured character string. In this context, structure of the content of the data entry refers to the order of the building blocks of the data entry that can be transformed into tokens.

The parsing module 104 is configured to encode the content of each data entry 118 in a list of tokens so that the message can be reconstructed from the tokens. Generally, the token order is determined based on the order of the characters in the data entry 118. In other words, the order of the tokens representing the data entry 118 correspond to the order of the characters in the data stream to preserve the structure of the content of the data entry.

The parsing module 104 parses the data stream as follows. The parsing module 104 ingests the data stream. In some implementations, the parsing module 104 can ingest the data stream one character at a time. In some implementations the parsing module 104 can ingest the data stream in batches of characters. The parsing module 104 applies a deterministic finite automaton to the received data stream to generate the tokens. The automaton includes a set of parsing rules for tokenizing the data stream into tokens. For example, when a character is received, the parsing module 104 can determine whether a particular token should be generated based on the preceding characters that were received. The automaton can include a lookup table, a directed graph, a state machine, etc. and is described in further detail in relation to FIGS. 2-4. Computation cost of applying the set of parsing rules is independent of the number of parsing rules included.

Generally, the parsing rules can be evaluated against the data stream by using a finite automaton. In some implementations, the parsing module 104 then applies consolidation rules to the generated tokens to enrich token attributes. For example, consolidation rules can be used to detect that a word token is a key is a key in a key-value sequence. Generally, because a key is an indicator of a structure of a message, the key value should not become a variable during the clustering stage. Rather, the key value should be preserved in the token. In another example, consolidation rules can be used to prevent a first token of the tokenized message from becoming a variable value (similar to the key value example). In this example, when a message begins with a word, the value of the word includes information about the meaning of the message, and so the value of the word is preserved in the token. As more of the data stream is ingested, additional patterns can be discovered in the data stream for applying the parsing rules. The parsing rules are consistently applied to the data stream so that the discovered patterns are deterministic. The parsing module 104 can apply the consolidation rules to the tokens to update the tokens (e.g., Boolean flags associated with one or more tokens), to reflect the structure of a data entry 118 including the token and the position of the token in relation to that structure.

The tokens that are generated by the parsing module 104 can be stored by the monitoring system 102 in a storage as tokens data 108. In some implementations, a library of tokens can be generated over time for computing system 114, facilitating the parsing of the data stream and the generation of the tokens by the parsing module 104. For example, a finite automaton can be updated (e.g., built-out) as the parsing module 104 generates more tokens from the computing system 114. As subsequently described, the finite automaton can include one or both of lookup tables, directed graphs, etc.

The clustering module 106 of the monitoring system 102 is configured to cluster data entries 118 of the data stream based on the tokens of each data entry. The clustering of the clustering module 106 combines two or more data entries 118 of the data stream into a cluster, and also includes a count of the number of data entries 118 in the cluster.

Figure 5:
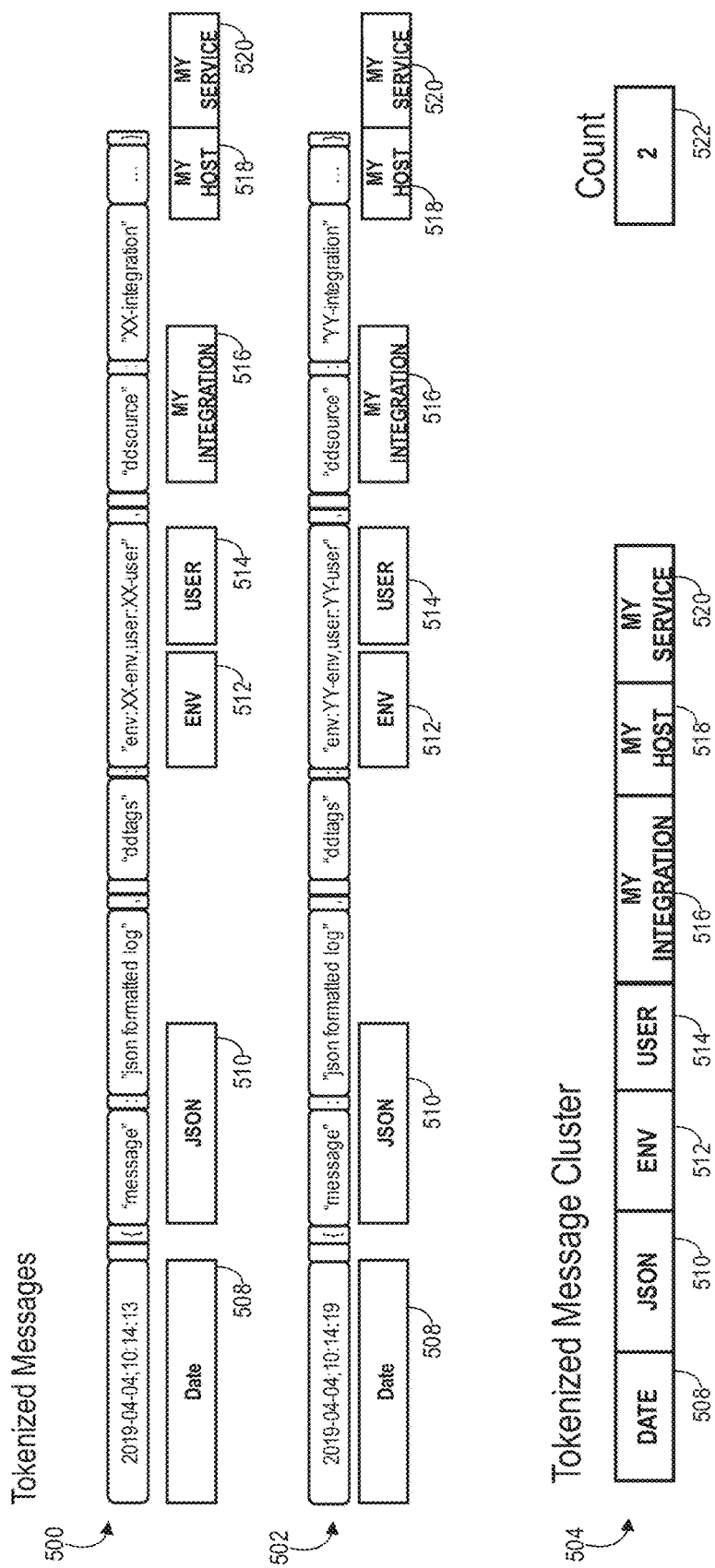
FIG. 5 shows an example of clustering two tokenized log messages and consolidating a tokenized log message.

The cluster includes the tokens that are in each of the data entries 118 represented by the cluster, clustering attributes, and a collector. Generally, to be clustered together, data entries 118 include the same token types in the same order, after any consolidation rules have been applied by the parsing module 104. Thus, the cluster includes a sequence of tokens in a particular order and a count of the number of data entries represented by the cluster, which can be referred to as a cluster pattern. The clustering attributes include attributes of the tokens represented in the metadata associated with the tokens. These clustering attributes include attributes that are associated with the data stream, and rather than being extracted from the log message or the tokens, they are generated by the system that produces the data stream. The clustering attributes are analyzed by the collector to determine whether a data entry should be added to the cluster. For example, clustering attributes can include a service identifier, a severity of an error message included in the data entry, a hostname identifier, and so forth. The clustering module 106 can cluster data entries according to different criteria that is established by the monitoring system 102 and which can depend on the particular application (e.g., what the data stream includes). The collector receives the tokens from the parsing module 104. Generally, the collector receives the list of tokens and their associated metadata representing a data entry 118. If the list of tokens matches the list of tokens specified for the cluster, the collector analyses the associated metadata and determines whether the data entry should be added to the cluster. The collector is configured to maintain the counter for the cluster and other statistics for the cluster, track the distribution of the data entries in the cluster, and, in some examples, maintain samples of the actual strings of characters for representative data entries included in the cluster. An example of a cluster is shown in FIG. 5.

The clustering module 106 algorithm tracks the list of the clusters of the data entries 118 that have already been processed. When processing an incoming tokenized data entry, the clustering module 106 first checks existing clusters to determine whether any existing cluster includes a token sequence matching the tokenized data entry. If this is the case, the clustering module 106 processes the tokenized data entry by the collector of the cluster, and merges the tokenized data entry into the cluster if appropriate. Otherwise, the clustering module 106 generates a new cluster including the tokenized data entry.

A tokenized data entry is merged into a cluster if the clustering attributes of the tokenized data entry match the attributes of the cluster. This can be either restrictive or non-restrictive, depending on the purpose of the monitoring system 102. For example, the monitoring system 102 can specify that a cluster includes only data entries 118 having the same service identifier. However, the monitoring system 102 can specify that clusters need only include the same token list, regardless of the attribute values specified in the metadata.

The clustering module 106 adds a data entry 118 to a cluster when the number of tokens in the incoming tokenized data entry matches the number of tokens in the cluster pattern. The clustering module 106 can partition clusters based on the clustering attributes of the cluster (e.g., an identifier of the host system that produced the data stream) and the number of tokens in the cluster pattern. To reduce processing times, the clustering module 106 can check only the matching cluster candidates when processing an incoming tokenized data entry 118 from the parsing module 104.

Generally, as previously described, a cluster is characterized by a token pattern, which includes a sequence of tokens that describes the structure and the content of the logs that belong to the clusters. If the cluster contains only one data entry 118, the token pattern corresponds to the sequence of tokens of the tokenized data entry 118. When other incoming data entries 118 are processed, to determine if a data entry should be included in a given cluster, the clustering module 106 determines whether the token pattern can be merged with the tokenized data entry 118 token pattern. Specifically, the clustering module 106 compares whether each token of the tokenized data entry is pairwise mergeable to the cluster pattern. If all the token pairs are mergeable, then the data entry fits in the cluster and the clustering module 106 adds the data entry to the given cluster.

Generally, two tokens are considered to be mergeable if the tokens have the same attribute type. In some implementations, the clustering module 106 can include type-specific rules that prevent over-merging. For example, punctuation characters generally can reflect a structure of the content of the data entry. To ensure that only data entries having content with matching structure are merged, tokens that represent punctuation characters can be considered mergeable only if they encode the same character. Other such rules are possible as well (e.g., tokens including given characters or character sequences can be considered mergeable only if they exactly match).

The clustering module 106 can track the distribution (e.g., diversity) of data entries that belong to a given cluster, because the data entries 118 in a cluster need not exactly match one another. Adding a log to a cluster includes updating the token patterns by merging each of its tokens with the matching token of the incoming data entry and updating the properties of the cluster to reflect the diversity of the data entries that belong to the cluster. For example, many tokens include a Boolean flag that is true if and only if the token is a wildcard (i.e., if it results from merging tokens with distinct values). Wildcard tokens include tokens which may represent different actual characters in the data entry but that represent the same content structure across different data entries. For example, a wildcard token can include a token representing a variable name. Generally, wildcard tokens occur for tokens that are unlikely to represent uniform characters for many data entries, such as time stamps, variable names, numeric values, and so forth. The wildcard token can ignore the value of the attribute that it is tokenizing, and instead only track the token type. For example, two tokens representing different time stamp values can be merged because they both represent time stamps, which is the information of interest to the monitoring system 102.

The clustering module 106 generates the clusters and stores the clusters as clusters data 110. The clusters data 110 can be returned to a client device 112 in response to receiving a request for the clusters data 110. For example, a request for all the clusters or a portion of the clusters that include a particular clustering attribute can be requested by the client device 112. The monitoring system 102 can return those clusters in response. For example, the monitoring system 102 can output the clusters data 110 as a ranked list of clusters. For example, clusters can be ranked from least frequent to most frequent. A user can then quickly determine the behavior of the computing system 114 by reviewing the ranked clusters because data entries (e.g., logs) indicative of anomalous behavior are shown prominently, while routine log messages can be deemphasized. By reporting the clusters data 110, thousands or even millions of data entries 118 can be consolidated into tens or hundreds of clusters.

In some examples, data entries that include the same structure may be tokenized differently and include different number of tokens to one another. To ensure that such data entries are included in the same cluster, additional rules can be applied by the clustering module 106 that make it possible to merge one token from a given data entry 118 with multiple tokens from another data entry. For example, lists, variable-length query strings and error messages, etc. can be detected by the consolidation rules and flagged as variable-length sections during the tokenizing process previously described. When the clustering module 106 is determining the eligibility of merging a data entry to given clusters, the clustering logic is able to merge different numbers of tokens together in those sections.

As described above, the computing system 114 is communicatively connected to the client device 112 and the monitoring system 102 through a network 116. The computing system 114 can include, but are not limited to, e.g., one or more server computers, end devices, etc. The computing system 114 can be configured to transmit, receive, and/or process data. For instance, in some cases, the computing system 114 can be a web server configured to receive and store content (e.g., web content, such as a web page), and make the content available to one or more other computer systems (e.g., client device 112). Upon receiving a request (e.g., from the client device 112), the computing system 114 can retrieve the requested content and transmit the content to the requesting computer system to fulfill the request. In some implementations the computing system 114 stores a log indicating that the computing system has performed an action (e.g., responded to such a request). The logs can be stored as data entries 118. In some cases, the computing system 114 can be owned, operated, and/or maintained by parties different from those that own, operate, and/or maintain the computing system 102. In some implementations, the computing system 114 and the monitoring system 102 can be combined into a common hardware device.

The monitoring system 102 is also communicatively connected to one or more client devices 112 through the network 116. Each client device 112 includes a respective user interface (not shown). Users can interact with the user interface to view reports generated by the monitoring system 102 (e.g., lists of clusters). Users can also interact with the user interface to transmit data to other devices (e.g., to the monitoring system 102 and the computing system 114). Users can interact with the user interface to issue commands (e.g., to the monitoring system 102, and to the computing system 114). In some implementations, a user can install a software application onto a client device 112 in order to facilitate performance of these tasks.

The monitoring system 102 can be a portion of the client device 112. The parsing module 104 and/or the clustering module 106 can one or both be executed by the client device 112. For example, the logic of the parsing module 104 and/or clustering module 106 can be executed as an application installed on the client device 112. The logic of one or both of the parsing module 104 and clustering module 106 can be executed either before the client device 112 requests a report or during and/or after a report is requested by the client device 112.

The client device 112 can be any electronic device that is used by a user to view, process, transmit and receive data. Examples of the client device 112 include computers (such as desktop computers, notebook computers, server systems, etc.), mobile computing devices (such as cellular phones, smartphones, tablets, personal data assistants, notebook computers with networking capability), and other computing devices capable of transmitting and receiving data from the network 116. The client device 112 can include devices that operate using one or more operating system (e.g., Microsoft Windows, Apple OSX, Linux, Unix, Android, Apple iOS, etc.) and/or architectures (e.g., x86, PowerPC, ARM, etc.) In some implementations, the client device 112 need not be located locally with respect to the rest of the environment 100, and can be located in one or more remote physical locations.

The network 116 can be any communications network through which data can be transferred and shared. For example, the network 116 can be a local area network (LAN) or a wide-area network (WAN), such as the Internet. The network 116 can be implemented using various networking interfaces, for instance wireless networking interfaces (such as Wi-Fi, Bluetooth, or infrared) or wired networking interfaces (such as Ethernet or serial connection). The network 116 also can include combinations of more than one network, and can be implemented using one or more networking interfaces.

The monitoring system 102 and the computing system 114 are each illustrated as a respective single component. However, in practice, each can be implemented on one or more computing devices. A monitoring system 102 or a computing system 114 can be, for instance, a single computing device that is connected to the network 116. In some implementations, a monitoring system 102 or a computing system 114 can include multiple computing devices that are connected to the network 116. For instance, the monitoring system 102 can include several computing devices, and the parsing module 104 and the clustering module 106 can be distributed on one or more of these computing devices. In some implementations, a monitoring system 102 or a computing system 114 need not be located locally to the rest of the environment 100, and portions of the monitoring system 102 or the computing system 114 can be located in one or more remote physical locations.

Figure 2:
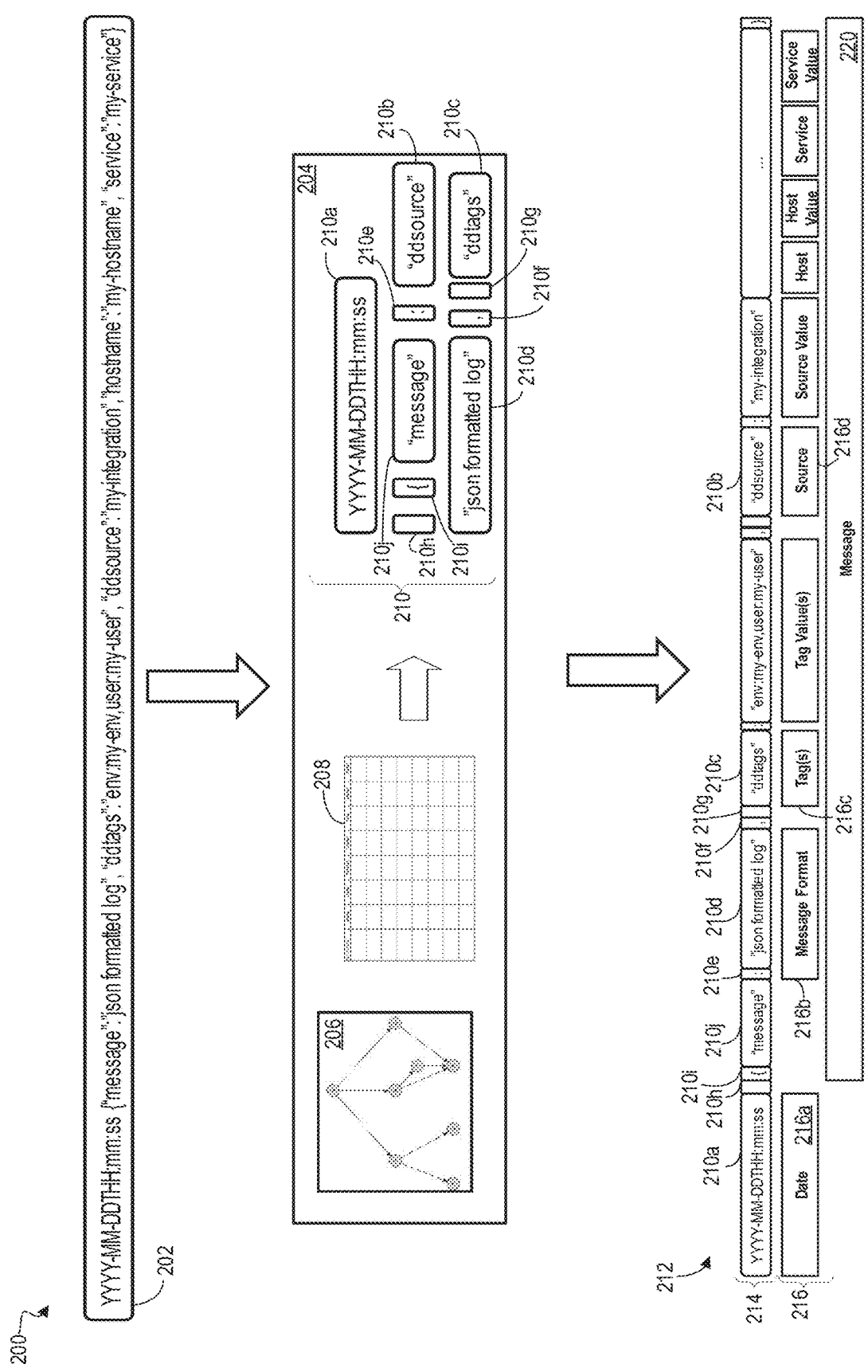
FIG. 2 shows an example process for transforming a log message into a sequence of tokens.

Turning to FIG. 2, an example process 200 for parsing a log message 202 into tokens is shown. The log message 202 includes the following data string: YYYY-MM-DDTHH:mm:ss {"message": "json formatted log", "ddtags": "env:my-env,user:my-user", "ddsource": "my-integration", "hostname": "my-hostname", "service": "my-service"}. This given log message 202 includes several distinct portions, including a time stamp YYYY-MM-DDTHH:mm:ss and a message, which is denoted by brackets {message: . . . }. Furthermore, the message structure can be divided into several sub-portions. The message includes a formatting statement "json formatted log", a tag definition statement "ddtags":"env:my-env,user:my-user", a source definition "ddsource": "my-integration", a host identifier definition "hostname":"my-hostname", and a service identifier "service": "my-service". The parsing module 104 is configured to identify these portions and tokenize the log message 202 into these portions, which represent the overall structure of the content of the log message (e.g., time stamp, message: format, tags, source, host, service). The portions of the log message 202 shown are tokenized into tokens with corresponding attributes identifying those portions.

In some implementations, the parsing module 104 is configured to parse the message 220 of the log message 212 rather than the log message 212 as a whole. The content of the message 220 can be parsed into tokens in a similar manner, such as into key tokens, Internet Protocol (IP) address tokens, error code tokens, and so forth based on the syntax of the characters of the message 220. In this case, the monitoring system 102 considers that log messages 212 are well-structured objects including messages 220 and clustering attributes 216 that are directly accessible (rather than being parsed from the log message 212 as shown in FIG. 2). Therefore, rather than parsing out the hostname, source, etc., the monitoring system 102 clusters log messages 212 based on the content of the message 220 only.

While the log message 202 shown includes given portions for illustrative purposes, other log messages with completely different content structures are possible. Additionally, the parsing module 104 need not receive log messages, but can parse any data stream for its content structure if the data stream has a content structure. As stated above, this does not require the data stream to include structured data. In some implementations, the data stream is generally an unstructured stream of characters, and the parsing module 104 infers the content structure as described throughout this disclosure. For example, the parsing module 104 determines what characters are part of the log message 202 and what characters are included in a subsequent or prior log message based on the structure of the content. For example, the parsing module 104 can have a rule stating that a "}" character denotes the end of a log message, such that any characters following "}" are not included in a particular log message.

The log message 202 can be generated by the computing system 114 in response to an operation occurring on the computing system 114. For example, the log message can describe how a service of the computing system 114 responded to a request from the client device 112. The parsing module 104 receives the string of characters of the log message 202 and applies one of the finite automaton(s) 206, 208 to generate tokens 210, as shown in box 204 of FIG. 2. Example applications of the automatons 206, 208 are described in relation to FIGS. 3A, 3B.

For the log message 202, the tokens 210 that are generated include a date token 210a, a source token 210b, a tags token 210c, a format token 210d, and punctuation tokens 210e, 210f, 210g, 210h, and 210i. The date token 210a includes both numeric characters and punctuation characters to include YYYY-MM-DDTHH:mm:ss. The parsing module 104 can determine that these characters comprise a date because of the order of the characters. For example, the parsing module 104 can determine that a sequence of four numbers YYYY, followed by a dash, followed by two numeric characters MM and so on indicates a time stamp. The next character that is received in the data stream is whitespace, which the parsing module 104 can know to tokenize individually as a token 210h when the whitespace follows a time stamp. The parsing module 104 can then determine that a bracket "{" should also be tokenized as token 210i because brackets indicate the structure of the log message. The word "message" is tokenized as token 210j because it falls inside quotes. Similar logic is applied when parsing tokens 210b, 210c, 210d, 210e, 210f, and 210g. The tokens 210 can be stored as tokens data 108, as described in relation to FIG. 1.

Once the parsing module 104 has generated the tokens 210, the ordered list 214 of tokens represents a tokenized log message 212. The ordered list 214 of the tokens 210 orders the tokens in an order that corresponds to the order of the characters of the data stream received as a log message 202. The tokens 210 can each be associated with attribute types and/or attribute values. For example, the token 210a is associated with a date 216a attribute. The token 210d representing the characters "json formatted log" is associated with a message format 216b attribute. The token 210c representing the characters "ddtags" is associated with an attribute of tag(s) 216c. The token 210b representing the characters "ddsource" is associated with an attribute source 216d. The other tokens are also associated with attribute types and values where applicable. For example, tokens 210e-i can be associated with a punctuation attribute. In some implementations a token can be associated with more than one attribute. For example, every token representing characters within the brackets { . . . } of the log message 202 is associated with a message attribute 220 in addition to other attributes. The attributes 216 are used by the clustering module 106 to determine whether the log message 202 should be clustered into an existing cluster or whether a new cluster should be generated for the log message 202.

Figure 3A:
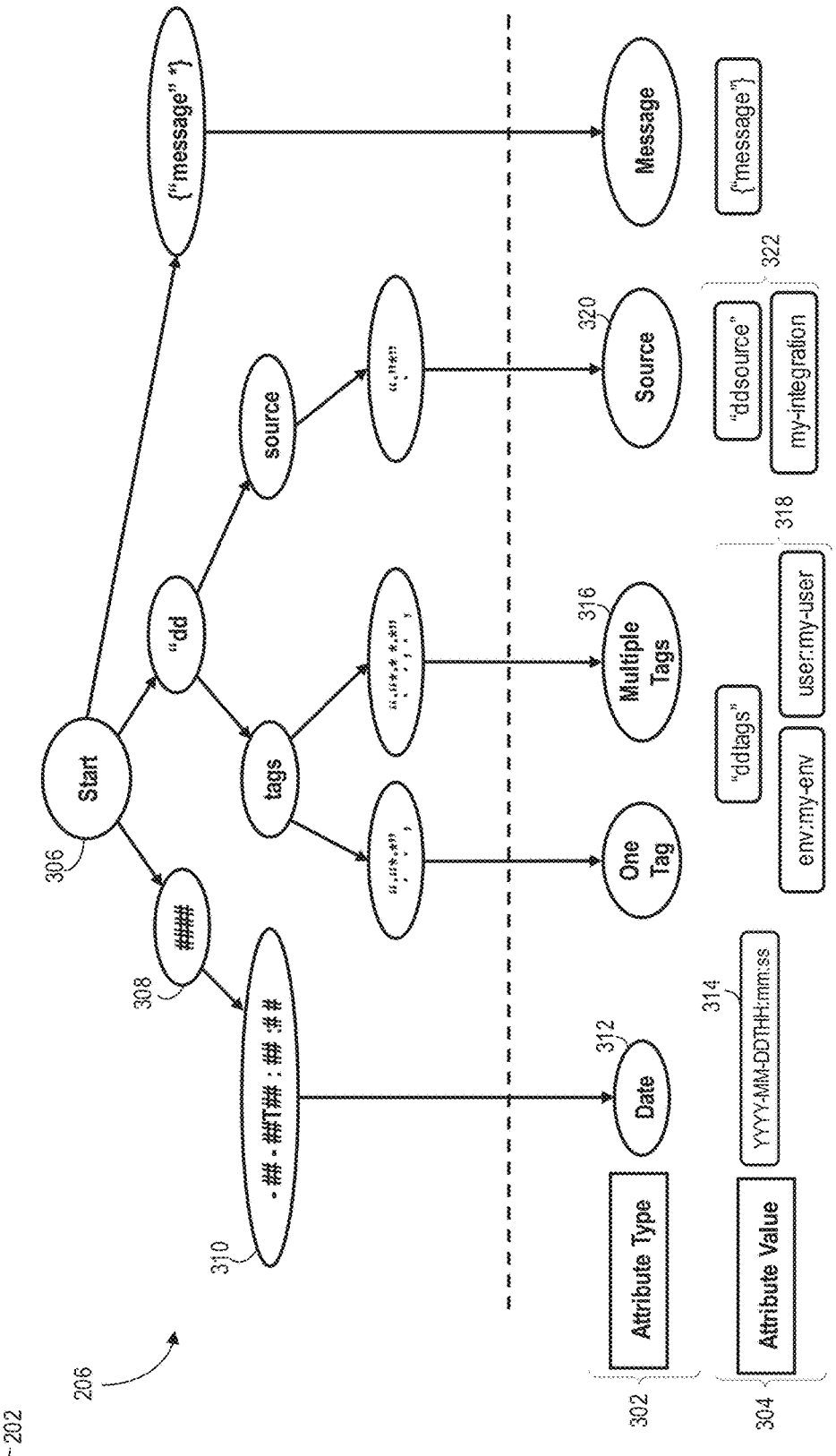
FIG. 3A shows an example finite automaton including a graph structure for tokenizing a log message.

Turning to FIG. 3A, a finite automaton including a directed graph 206 is shown. The parsing module 104 can use the directed graph to determine how the log message 202 should be tokenized. Although the characters of the log message 202 can be processed one by one, the directed graph 206 shows groups of characters to simplify the representation for illustrative purposes.

When a new character is received, the parsing module 104 starts at node 306 of the graph 206. Once four sequential numerical characters are received, the graph is at node 308. Once the string of ####-##-## T ##:##:## is received, the parsing module 104 advances through node 310 and determines that the characters that have been received should be tokenized into a date token 312. The characters are grouped into a token 312 with a date attribute type 302. In some implementations, the particular value 304 of the token can also be saved.

Other similar syntax-based rules are possible. For example, if the data stream can include a string of characters having a format of "###.###.###.###" for an IP token, or "##.#", with variable numbers of digits, for a numeric token.

These types can be recognized and assigned the token type in a manner similar to the date 312 token. In another example, a tokenizing rule can exist for matching the URI syntax (as defined in RFC3986). Other rules for identifying these formats and generating tokens from them with assigned token types are possible.

The parsing module 104 returns to the start 306 of the graph 206. Further ingestion of characters of the log message 202 lead down different paths of the graph 206 to different tokens. For example, if the path to the multiple tags attribute 316 is reached, the parsing module 104 can tokenize the characters "ddtags" as a tags attribute type 302 and the characters env:my-env and user:my-user as respective attribute values 304 of the tag attribute type. In some implementations, the characters env:my-env and user:my-user are each associated with another attribute type, such as ENV and USER, respectively, to complete the tokens 318. Similarly, the characters "ddsource" can be tokenized as a source attribute 320 and the characters my-integration as the attribute value 322 of the source attribute type. The characters my-integration can be associated with a source attribute value 304 that is different from other source attribute values. When the monitoring system 102 is partitioning the cluster data 110, responding to a query, or even clustering the log message 202 into a cluster, the value 304 of the source and tags can be taken into account if desired. In this way, the attributes of the tokens 210 define the structure of the content of the log message 202.

In some implementations, the graph 206 can be updated as more log messages are tokenized. New paths can be created to handle new character sequences. The graph 206 is configured so that any possible character sequence for the data stream corresponds to a path in the graph 206.

Figure 3B:
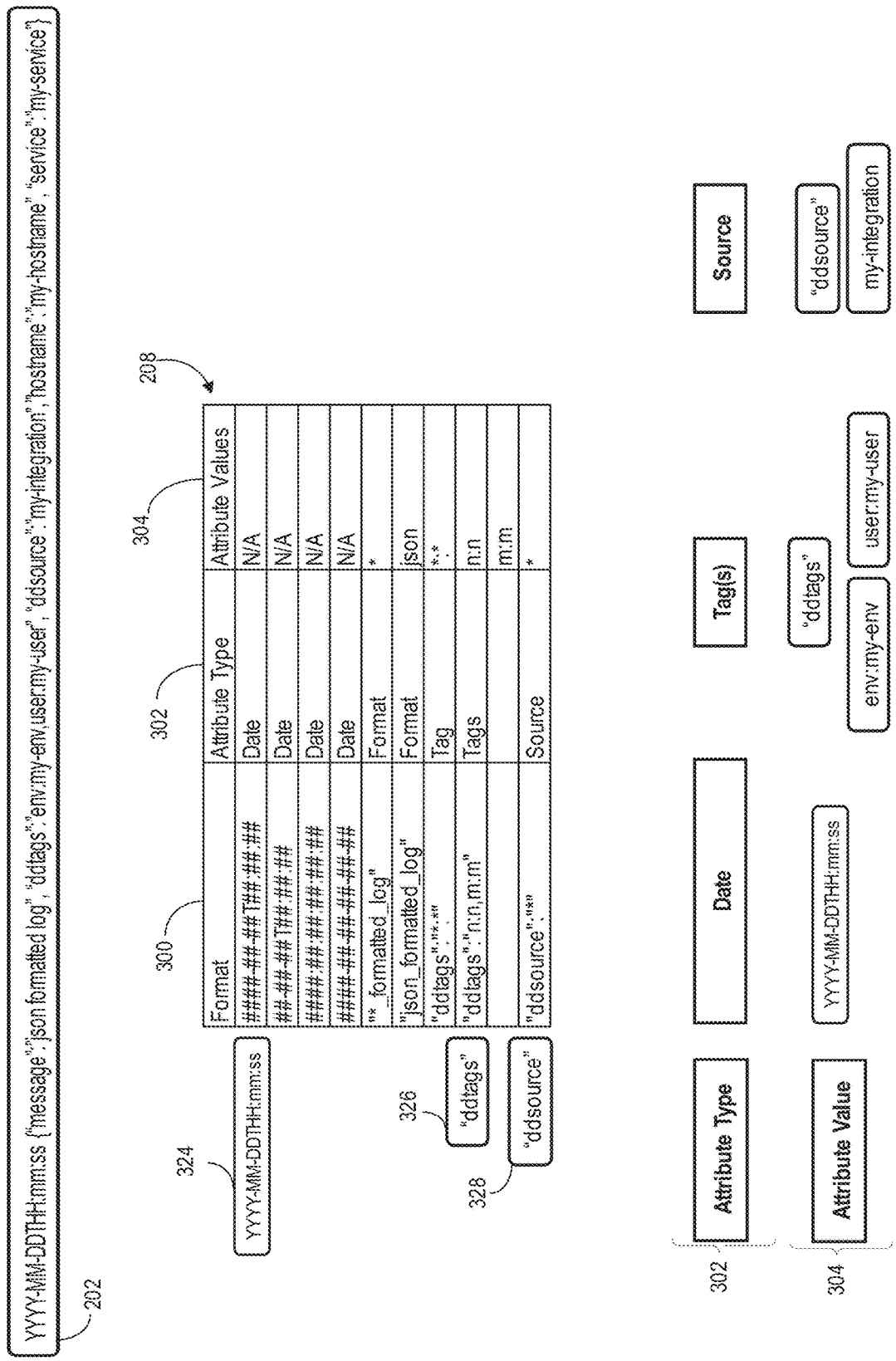
FIG. 3B shows an example finite automaton including a lookup table for tokenizing a log message.

Turning to FIG. 3B, an example of a lookup table 208 that can be used for tokenization of the log message 202. In some implementations, the lookup table can be used in the alternative to the graph 206. The lookup table 208 can include a list of parsing rules 300. Each rule of the list 300 is associated with attribute types 302 and attribute values 304 where applicable.

When the parsing module 104 receives a character sequence that matches a rule of the list 300, the characters are converted to a token with the attribute type and value(s) shown in the table 208. For example, when a sequence of characters including ####-##-## T ##:##:## is received, the token 324 is generated to represent those characters, and the attribute type date is associated with token 324. Here, a character # includes any numerical character. In another example, when the characters including "ddtags":"n:n,m:m" are received, the parsing module 104 generates the token ddtags 326 with attribute 302 tags and values 304 n:n and m:m. In this example, n:n represents a first tag type and tag value, and m:m represents a second, different tag type and tag value. In yet another example, when the character sequence "ddsource" is received, the parsing module 104 determines that the subsequent characters "*:*" are a source type and source value. The parsing module 104 generates the token ddsource 328 with a type 302 of source and a value 304 of my-integration. Here, * represents any number of following alpha-numeric characters until a punctuation character is received. Similar to the graph 206, the table 208 can be updated with new tokenizing rules as new character sequences are added to the data stream (e.g., new log messages are defined for the computing system 114). Thus, the parsing module 104 can generate tokens 210 either from a table 208 or a graph 206 or a combination of both a table and a graph.

Figure 4:
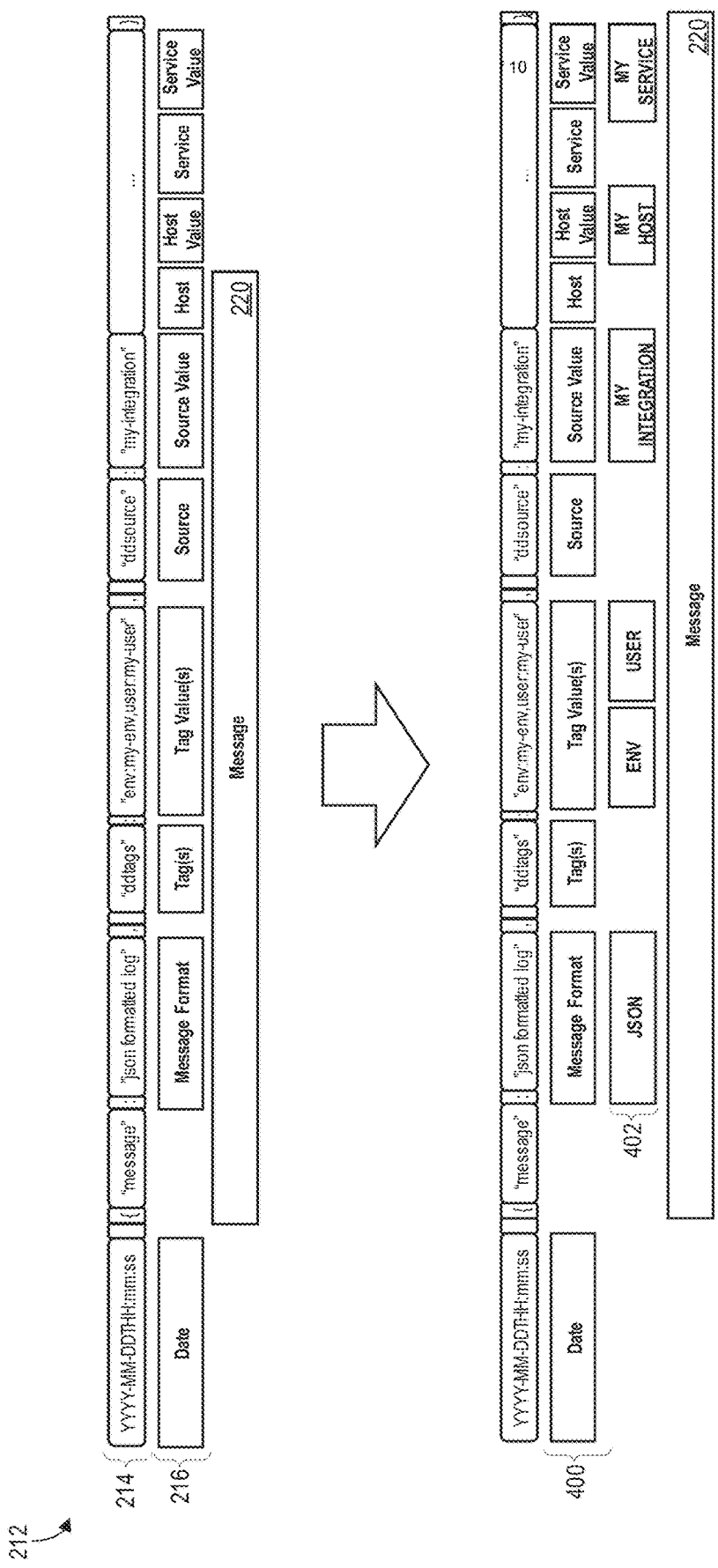
FIG. 4 shows an example of attributes and attribute values associated with a tokenized log message.

Turning to FIG. 4, an example of a tokenized log message 212 is shown. The tokenized log message 212 is tokenized from log message 202 of FIGS. 2-3B. The tokenized log message 212 includes a token sequence 214 of tokens. The tokens of the token sequence 214 are associated with attributes 216 that specify the types and/or values of the tokens.

Once the parsing module 104 has tokenized the log message 202, the parsing module 104 further determines what the metadata 216 associated with the token sequence 214 should be. Generally, the metadata 216 is associated with the log message 212 (e.g., generated by the source of the log message), but is distinct from the log message. In some implementations, the parsing module 104 can store values 402 of given tokens 400. The values can be used to partition the tokenized log message 212 from other log messages once the tokenized log message 212 is included in a cluster. For example, the monitoring system 102 can receive a query for log messages of a cluster that include a given tag (e.g., ENV or USER), a given source (e.g., MY INTEGRATION), a given host (e.g., MY HOST), or a given service (e.g., MY SERVICE). If any of these values are queried, the monitoring system 102 can return the cluster(s), number of tokenized log messages 212, etc. that include those values.

Turning to FIG. 5, an example of clustering two tokenized log messages 500, 502 is shown. Each of the tokenized log messages 500, 502 includes a similar list of tokens. For example, both tokenized log messages 500, 502 include a date token 508, a JSON format token 510, an ENV tag token 512, a USER tag token 514, a MY INTEGRATION source token 516, a MY HOST host token 518, and a MY SERVICE service token 520. In this example, the values of some of these tokens vary between tokenized log message 500 and tokenized log message 502. For example, tokenized log message 500 includes tag values of XX-ENV and XX-USER, which differ from the tag values of YY-ENV and YY-USER of tokenized log message 502. Thus, the messages 500, 502 differ in content even though they share the same content structure.

In situations where in the tag values (and source values) are unimportant to the monitoring system 102, the tokenized log messages 500, 502 can be merged into the same cluster. In situations where the tag values and source values of tokenized log messages 500, 502 are considered important distinctions, the messages 500, 502 would not be merged because the values of these tokens 512, 514, 516 are different (even though the content structure is the same). This rule can be selectively applied to particular token types. For example, punctuation tokens generally are merged between messages 500, 502 only when the values of the tokens match exactly, because punctuation can be indicative of the structure of content of the log message. In another example, tokens that represent variable values (such as time stamps) can be merged regardless of the value because the value of such tokens is not indicative of the structure of the content of the log message 202.

To merge the messages 500, 502, the clustering module 106 performs a pair-by-pair comparison of the token lists of tokenized log message 500 and tokenized log message 502. For example, each message 500, 502 includes a date token 508 first. Because these tokens match (and no indication is given that the values of the dates must be equal), the clustering module 106 proceeds to the second token in each list (the JSON format token 510). These also match, and so the clustering module 106 proceeds to the third token in each list (and so on) until no attributes remain. If each comparison shows that the tokens match, the messages 500, 502 are merged into cluster 504 including the token list of tokens 508, 510, 512, 514, 516, 518, 520. In this example, the number and type of each token matches exactly for the messages 500, 502 to be merged.

In some implementations, the number and/or types of the tokens of the messages 500, 502 need not match exactly for the messages to be merged in a cluster. Additional rules can be defined so that two or more messages can be merged even if their token lists do not exactly match. For example, some tokens can be ignored, some tokens can be consolidated, some merge rules can require only one of a set of tokens to be included in the message, and so forth.

The tokenized log message cluster 504 can be associated with a count value 522. The count value 522 represents the number of messages included in the cluster. In the example of FIG. 5, because two tokenized log messages 500, 502 were merged, the count is at two. When the cluster is displayed to a user (e.g., by client device 112), the cluster 504 and the count 522 can be displayed together as part of a ranked list of clusters and their counts.

In some implementations, consolidation rules can be applied to the tokenized messages 500, 502. The consolidation rules can be applied to the list of tokens to reduce the number of tokens in the list. The consolidation rules can be applied by the parsing module 104 during the parsing process, or by the clustering module 106 during the clustering process. The consolidation rules can include ad hoc rules for each computing system 114. The consolidation rules can be generated by the monitoring system 102 when the monitoring system 102 detects patterns in the token lists that are generated for each tokenized log message (or other data entry 118), or the consolidation rules can be defined (e.g., by a user, by importing a rule set, etc.) in advance of data stream ingestion by the monitoring system 102.

Generally, it is possible to generate clusters constantly as the data stream is received by the monitoring system 102 from the computing system 114. In some implementations, the monitoring system 102 generates clusters in batches (e.g., periodically or when a particular amount of data has been received). In some implementations, the computing system 114 sends the data entries 118 as a data stream periodically to the monitoring system 102, and the monitoring system 102 ingests the data stream immediately upon receipt. In another example, the clustering can be performed for data corresponding to a particular time period specified in a user query or by some other means, in response to receiving a request for a data report, and so forth.

In some implementations, clusters can include additional data about the data entries 118 represented in the cluster to provide additional details about the behavior of the computing system 114 to the client device 112. The cluster can store data related to values of the data represented by the tokens. For example, the cluster can include data that tracks a range of the values of the time stamps of the log messages in the cluster. In another example, the cluster can include data indicating the most common HTTP statuses of the cluster, or a distribution of the request durations reported by log messages of the cluster. Other statistical information can be stored along with the cluster such as maximum and minimum values of various tokens in each cluster. In another example, the monitoring system 102 can be configured to include statistics for the list of clusters, such as a frequency of a token in the cluster list or other statistical data.

Figure 8:
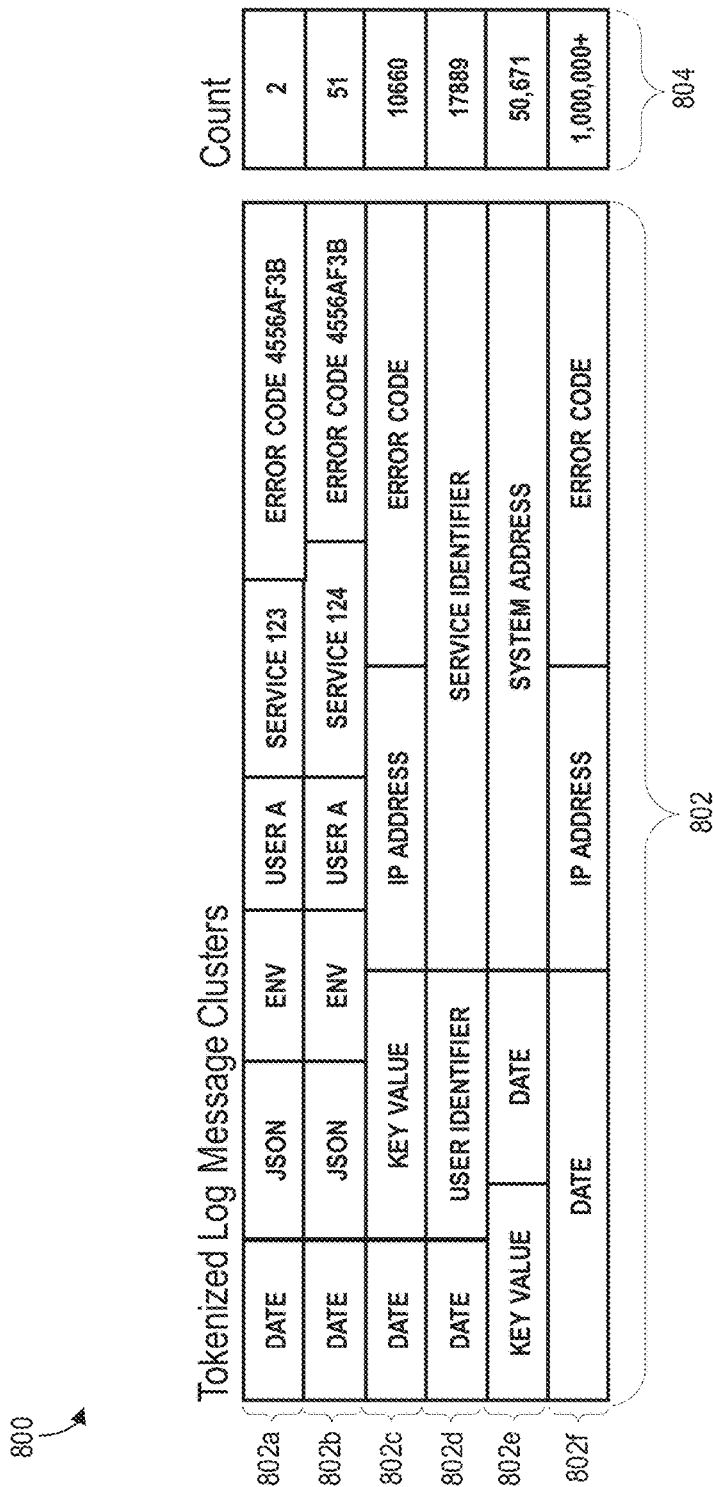
FIG. 8 shows an example of an output of the monitoring system.

Turning to FIG. 8, an example of an output 800 of the clustering process of the monitoring system 102 is shown. The output 800 can be sent by the monitoring system 102 to the client device 112 in response to a request by the client device for a summary of the operations of the computing system 114.

In the example output 800, the clusters 802 are ranked by count from lowest (cluster 802a) to highest (cluster 802f) counts. Other means of organizing the clusters, ranking the clusters, etc. can be used. However, ranking from lowest to highest counts shows the most unique clusters first, and likely the source of any anomalies in the operation of the computing system 114.

The cluster 802a includes log messages for a particular user (user A), a particular service (service 123), and a particular error code (error 4556AF3B). There were two log messages that included this content structure. A similar cluster 802b for a different service (service 124) but for the same user and for the same error code value occurred 51 times in during the course of the monitoring by the monitoring system 102. A user can deduce that the particular error is occurring for multiple services associated with user A. Clusters 802c-802f are progressively common in the structure denoted by the clusters, and the associated counts increase, respectively. Generally, clusters with a larger number of messages (such as cluster 802f) include a larger proportion of wildcard tokens (e.g., tokens without a particular data value), relative to clusters in which tokens are associated with specific values (e.g., clusters 802c, 802d, and 802e).

When displaying a token in the output 800, the monitoring system 102 can visualize a token based on the content of the token. For example, a token representing a particular value can show the value in the token in the cluster. In another example, for a wildcard token in the cluster that represents many different values of the attribute of the token, symbols can be used in place of the actual value (e.g., *, #, "*", etc.)

Figure 6:
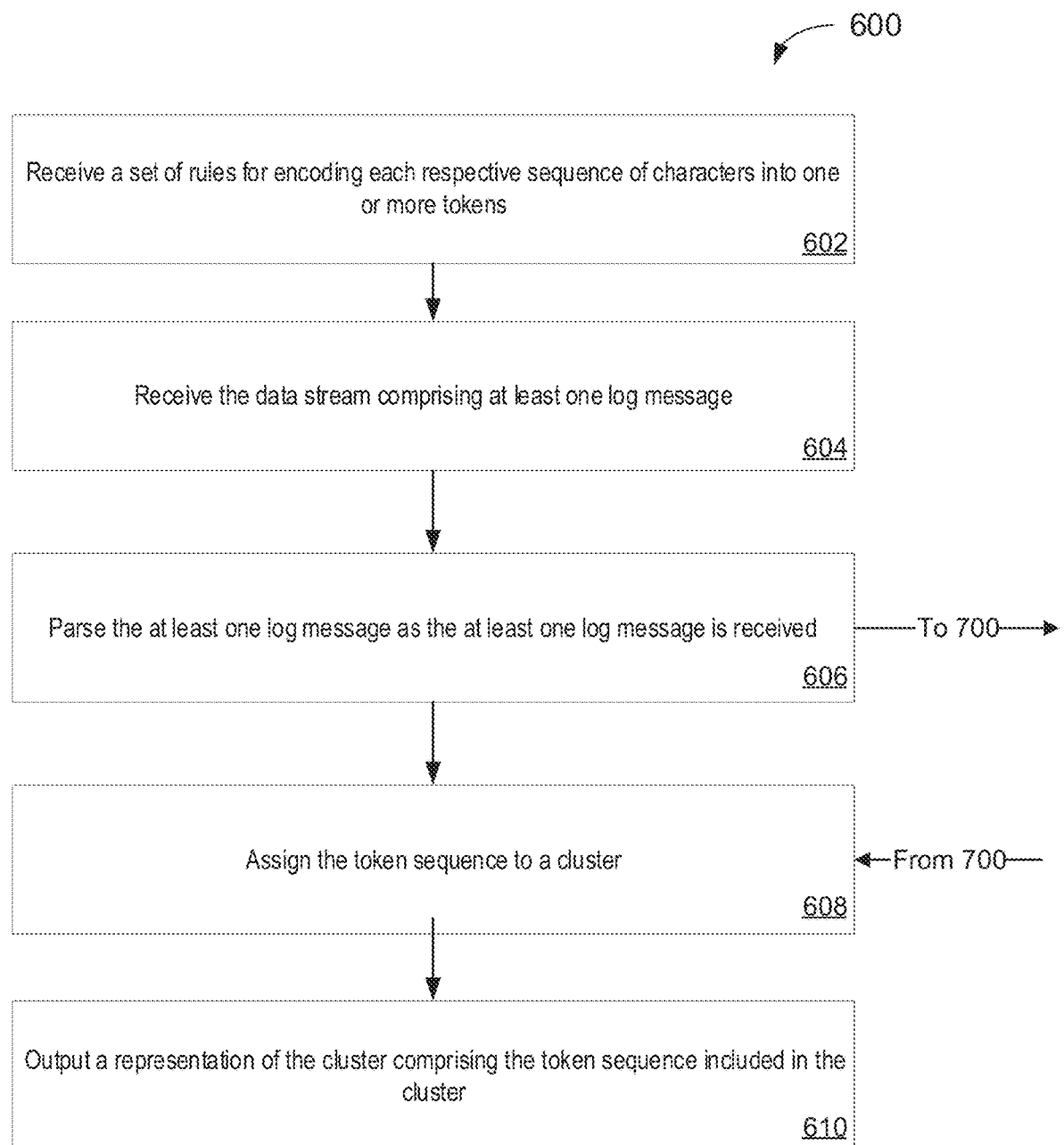
FIGS. 6-7 show example processes for transforming a data stream into structured data.

FIG. 6 shows an example process 600 for transforming a data stream into structured data indicative of the operations of a computing system (e.g., computing system 114 of FIG. 1). In some implementations, the process 600 is performed by the monitoring system 102 of FIG. 1.

The monitoring system 102 is configured to receive (602) a set of rules for encoding log message characters into at least one token. As described in relation to FIGS. 2-4, the set of rules can include a lookup table (e.g., table 208) and/or a graph (e.g., graph 206). The set of rules generally is deterministic and forms a finite automaton. The monitoring system 102 is configured to receive (604) the data stream comprising at least one log message. Generally, each log message includes a sequence of characters of the data stream. The monitoring system 102 is configured to parse (606) the at least one log message as the at least one log message is received. The parsing operations are described in relation to FIG. 7.

The monitoring system 102 is configured to assign (608) the sequence of tokens to a cluster. Generally, assigning the sequence of tokens to the cluster includes determining that the sequence of tokens matches a pattern by which the cluster is characterized and merging the sequence of tokens with the cluster. The monitoring system 102 is configured to output (610) a representation of the cluster comprising the sequence of tokens included in the cluster. Generally, the cluster indicative of a structure of at least a portion of the data stream. An example of the output (e.g., output 800) is shown in FIG. 8.

Figure 7:
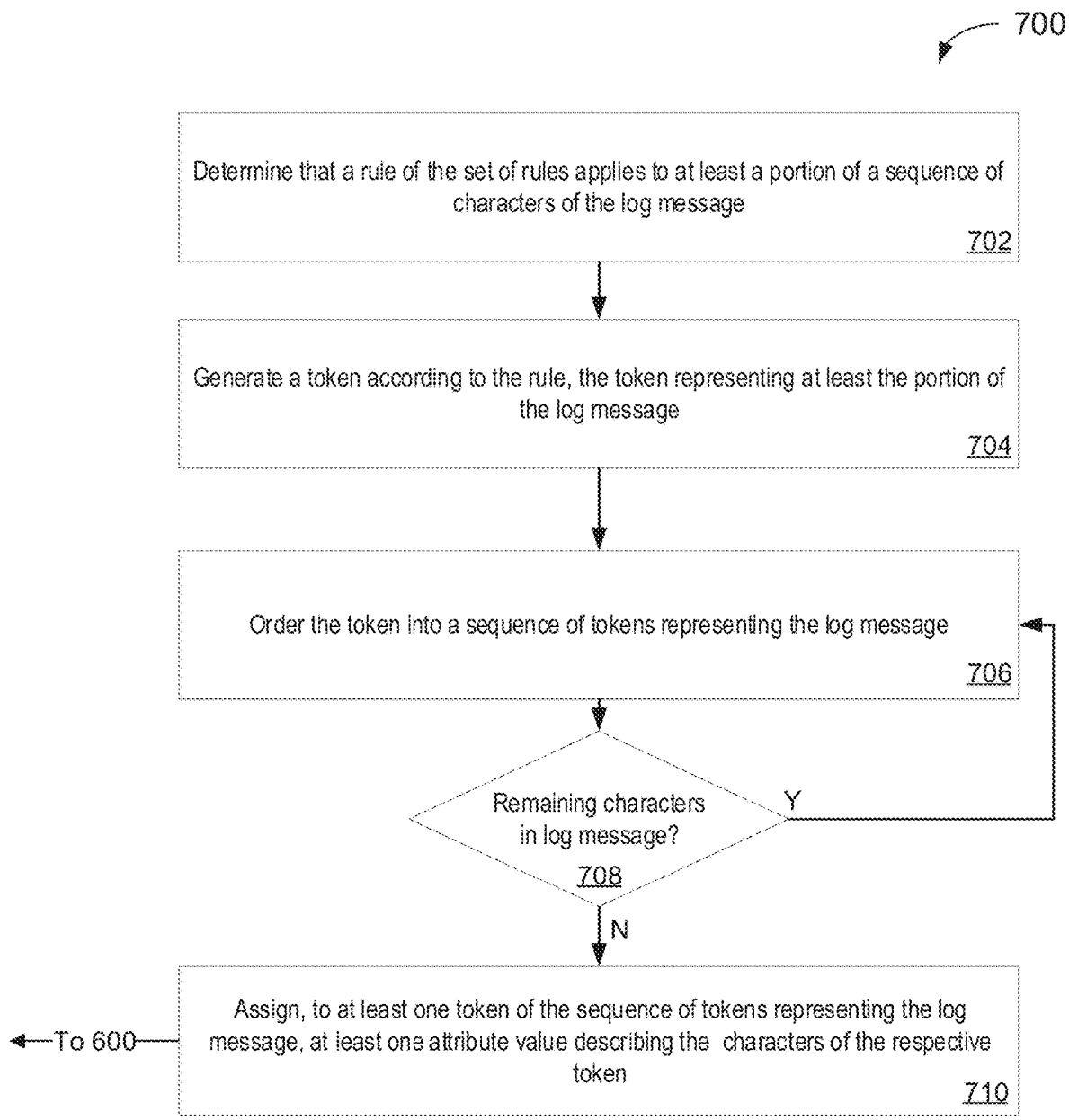

FIG. 7 shows an example process 700 for parsing the sequence of characters into tokens. Generally, the monitoring system 102 is configured to generate a plurality of tokens according to at least one rule of the set of rules described in relation to FIG. 7. Generally, each token represents a corresponding portion of the sequence of characters of the at least one log message. The monitoring system 102 is configured to form a sequence of tokens from the plurality of tokens. The monitoring system 102 is configured to assign, to at least one token of the sequence of tokens, at least one attribute value describing the corresponding portion of the sequence of characters of the corresponding token to which the attribute value is assigned, as described in relation to in FIG. 2.

More specifically, the monitoring system 102 is configured to determine (702) that a rule of the rule set applies to a portion of the sequence of characters of a log message. The monitoring system 102 is configured to generate (704) a token according to the rule, the token representing the portion of the log message. The monitoring system 102 is configured to order (706) the token into a sequence of tokens representing the log message. The monitoring system 102 is configured to determine (708) whether any characters remain in the log message. Generally, this determination comprises determining whether a new log message is represented by the next characters in the stream of characters. For example, a new time stamp can be indicative of a new log message. If characters remain in the log message, another token is generated (706) until no characters remain in the log message. If no characters remain, the monitoring system 102 assigns (708) to at least one token of the sequence of tokens representing the log message, at least one attribute value describing the characters of the respective token. The sequence of tokens is now generated for the log message, and is ready for clustering as described in relation to FIGS. 5 and 7.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the monitoring system 102, the client device 112, and the computing system 114 can be implemented using digital electronic circuitry, or in computer software, firmware, or hardware, or in combinations of one or more of them. In another example, the processes 600, 700, can be implemented using digital electronic circuitry, or in computer software, firmware, or hardware, or in combinations of one or more of them.

Some implementations described in this specification (e.g., the parsing module 104, the clustering module 106, etc.) can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. In some implementations, the parsing module 104 and/or the clustering module 106 comprises a data processing apparatus as described herein. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD-ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 9:
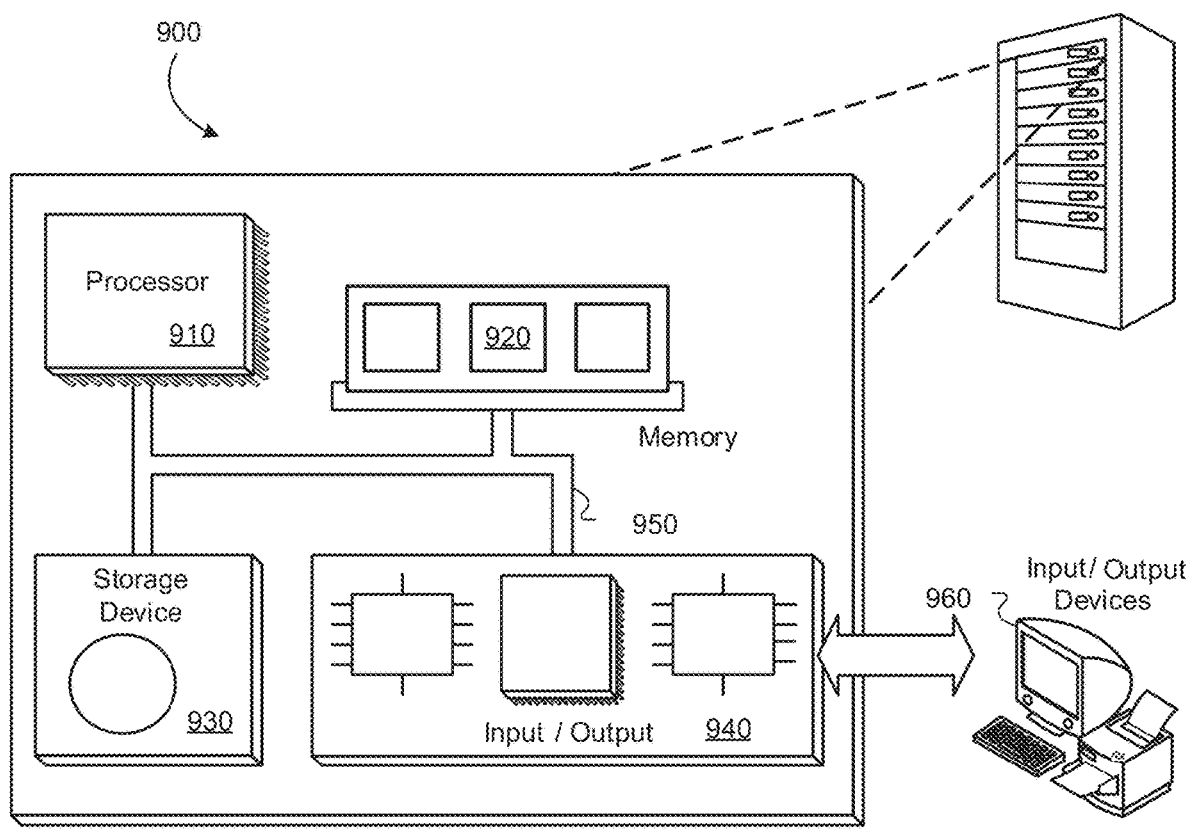
FIG. 9 is a diagram of an example computing system.

FIG. 9 shows an example computer system 900 that includes a processor 910, a memory 920, a storage device 930 and an input/output device 940. Each of the components 910, 920, 930 and 940 can be interconnected, for example, by a system bus 950. The processor 910 is capable of processing instructions for execution within the system 900. In some implementations, the processor 910 is a single-threaded processor, a multi-threaded processor, or another type of processor. The processor 910 is capable of processing instructions stored in the memory 920 or on the storage device 930. The memory 920 and the storage device 930 can store information within the system 900.

The input/output device 940 provides input/output operations for the system 900. In some implementations, the input/output device 940 can include one or more of a network interface device, e.g., an Ethernet card, a serial communication device, e.g., an RS-232 port, and/or a wireless interface device, e.g., an 802.11 card, a 3G wireless modem, a 4G wireless modem, a 5G wireless modem, etc. In some implementations, the input/output device can include driver devices configured to receive input data and send output data to other input/output devices, e.g., keyboard, printer and display devices 960. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

A number of embodiments have been described. Nevertheless, it will be understood that various modifications may be made without departing from the spirit and scope of the data processing system described herein. Accordingly, other embodiments are within the scope of the following claims.

What is claimed is:

1. A method for processing a data stream to identify a structure of the data stream, the method comprising:
   receiving the data stream comprising at least one log message, each log message comprising a sequence of characters;
   retrieving, from a data storage, a set of rules for encoding log message characters into at least one token;
   parsing the at least one log message as the at least one log message is received, wherein parsing comprises:
      generating a plurality of tokens according to at least one rule of the set of rules, wherein each token represents a corresponding portion of the sequence of characters of the at least one log message;
      forming a sequence of tokens from the plurality of tokens; and
      assigning, to at least one token of the sequence of tokens, at least one attribute value describing the corresponding portion of the sequence of characters of the corresponding token to which the attribute value is assigned, the attribute value being associated with at least one merging rule specifying with which tokens the at least one token is mergeable;
   assigning the sequence of tokens to a cluster comprising a sequence of cluster tokens, wherein assigning the sequence of tokens to the cluster comprises:
      identifying a sequence of attribute values corresponding to the sequence of tokens, the sequence of attribute values including the at least one attribute value;
      determining that the sequence of attribute values corresponding to the sequence of tokens matches a pattern by which the cluster is characterized by satisfying the at least one merging rule associated with the at least one attribute value; and
      in response to determining that the sequence matches, merging the sequence of tokens with the cluster; and
   outputting a representation of the cluster comprising the sequence of tokens included in the cluster, the cluster indicative of a structure of at least a portion of the data stream.

2. The method of claim 1, wherein parsing further comprises:
   determining that at least the portion of the sequence of characters represented by a token of the sequence of tokens comprises a variable having a predetermined type; and
   assigning an attribute value to the token indicating the type of the variable.

3. The method of claim 1, wherein the set of rules comprises a graph comprising nodes and edges, and wherein parsing the at least one log message further comprises:
   initializing a position in the graph at a root node of the nodes;
   for successive characters of the log message, traversing the graph from the root node along a path of the nodes and the edges until an end node is reached, the end node representing a particular token; and
   encoding each character represented by the path of the nodes and the edges into the particular token represented by the end node.

4. The method of claim 1, wherein the set of rules comprises a lookup table comprising at least one entry, the at least one entry comprising a mapping between a particular sequence of characters and a particular token; and
wherein parsing the at least one log message comprises:
determining that at least a portion of the sequence of characters of the log message matches the particular sequence of characters of an entry of the lookup table; and
encoding at least the portion of the sequence of characters as the particular token.

5. The method of claim 1, wherein determining that the sequence of attribute values corresponding to the sequence of tokens matches a pattern by which the cluster is characterized by satisfying the at least one merging rule associated with the at least one attribute value comprises:
determining that the sequence of tokens and the cluster each include a same number of tokens; and
determining that, for each given token of the sequence of tokens, the given token is mergeable with a given cluster token in a corresponding position in the sequence of cluster tokens by satisfying a first merging rule associated with a first attribute value of the given token and a second merging rule associated with the second attribute value of the given cluster token.

6. The method of claim 1, wherein assigning the sequence of tokens to the cluster comprises:
determining that the sequence of tokens comprises a particular token at a particular position in the sequence of tokens;
determining that the cluster comprises a unmergeable token at the particular position in the cluster; and
merging, in response to the determining, the sequence of tokens into a different cluster regardless of remaining tokens of the sequence of tokens.

7. The method of claim 1, wherein an attribute value represents a category of the sequence of characters represented by the token, the category comprising one of a key value, a date, an index, a query, an error code, an error message, and a variable value.

8. The method of claim 1, wherein the representation further comprises a list of each cluster generated from the data stream, the list including the representation of the cluster.

9. The method of claim 8, wherein the list of each cluster generated from the data stream is ordered based on a count value associated with each cluster.

10. The method of claim 1, wherein outputting the representation of the cluster is responsive to receiving a request for the representation of the cluster from a client device.

11. The method of claim 1, wherein at least one token of the representation of the cluster is represented as a code word or code symbol, the code word or code symbol being selected based on an attribute value associated with the at least one token.

12. The method of claim 1, wherein a token of the plurality of tokens represents a variable having a first value, and wherein the token is configured to be merged with a corresponding token of the cluster representing the variable having a second value, the first value being different from the second value.

13. A computing system for obtaining performance metrics for one or more computing devices, the system comprising:
at least one processor; and
at least one storage device storing instructions that are operable, when executed by the at least one processor, to cause the at least one processor to perform operations comprising:
receiving the data stream comprising at least one log message, each log message comprising a sequence of characters; and
retrieving, from a data storage, a set of rules for encoding log message characters into at least one token;
parsing the at least one log message as the at least one log message is received, wherein parsing comprises:
generating a plurality of tokens according to at least one rule of the set of rules, wherein each token represents a corresponding portion of the sequence of characters of the at least one log message;
forming a sequence of tokens from the plurality of tokens; and
assigning, to at least one token of the sequence of tokens, at least one attribute value describing the corresponding portion of the sequence of characters of the corresponding token to which the attribute value is assigned, the attribute value being associated with at least one merging rule specifying with which tokens the at least one token is mergeable;
assigning the sequence of tokens to a cluster comprising a sequence of cluster tokens, wherein assigning the sequence of tokens to the cluster comprises:
identifying a sequence of attribute values corresponding to the sequence of tokens, the sequence of attribute values including the at least one attribute value;
determining that the sequence of attribute values corresponding to the sequence of tokens matches a pattern by which the cluster is characterized by satisfying the at least one merging rule associated with the at least one attribute value; and
in response to determining that the sequence matches, merging the sequence of tokens with the cluster; and
outputting a representation of the cluster comprising the sequence of tokens included in the cluster, the cluster indicative of a structure of at least a portion of the data stream.

14. The computing system of claim 13, wherein the operations further comprise:
determining that at least the portion of the sequence of characters represented by a token of the sequence of tokens comprises a variable having a predetermined type; and
assigning an attribute value to the token indicating the type of the variable.

15. The computing system of claim 13, wherein the set of rules comprises a graph comprising nodes and edges, and wherein parsing the at least one log message further comprises:
initializing a position in the graph at a root node of the nodes;
for successive characters of the log message, traversing the graph from the root node along a path of the nodes and the edges until an end node is reached, the end node representing a particular token; and
encoding each character represented by the path of the nodes and the edges into the particular token represented by the end node.

16. The computing system of claim 13, wherein the set of rules comprises a lookup table comprising at least one entry, the at least one entry comprising a mapping between a particular sequence of characters and a particular token; and wherein parsing the at least one log message further comprises:
  determining that at least a portion of the sequence of characters of the log message matches the particular sequence of characters of an entry of the lookup table; and
  encoding at least the portion of the sequence of characters as the particular token.

17. The computing system of claim 13, wherein that the sequence of attribute values corresponding to the sequence of tokens matches a pattern by which the cluster is characterized by satisfying the at least one merging rule associated with the at least one attribute value comprises:
  determining that the sequence of tokens and the cluster each include a same number of tokens; and
  determining that, for each given token of the sequence of tokens, the given token is mergeable with a given cluster token in a corresponding position in the sequence of cluster tokens by satisfying a first merging rule associated with a first attribute value of the given token and a second merging rule associated with the second attribute value of the given cluster token.

18. The computing system of claim 13, wherein assigning the sequence of tokens to the cluster comprises:
  determining that the sequence of tokens comprises a particular token at a particular position in the sequence of tokens;
  determining that the cluster comprises a unmergeable token at the particular position in the cluster; and
  sorting, in response to the determining, the sequence of tokens into a different cluster regardless of remaining tokens of the sequence of tokens.

19. The computing system of claim 13, wherein the representation further comprises a list of each cluster generated from the data stream, the list including the representation of the cluster.

20. One or more non-transitory computer readable media storing instructions that are executable by one or more processors configured to perform operations comprising:
  receiving the data stream comprising at least one log message, each log message comprising a sequence of characters;
  retrieving, from a data storage, a set of rules for encoding log message characters into at least one token;
  parsing the at least one log message as the at least one log message is received, wherein parsing comprises:
    generating a plurality of tokens according to at least one rule of the set of rules, wherein each token represents a corresponding portion of the sequence of characters of the at least one log message;
    forming a sequence of tokens from the plurality of tokens; and
    assigning, to at least one token of the sequence of tokens, at least one attribute value describing the corresponding portion of the sequence of characters of the corresponding token to which the attribute value is assigned, the attribute value being associated with at least one merging rule specifying with which tokens the at least one token is mergeable;
  assigning the sequence of tokens to a cluster comprising a sequence of cluster tokens, wherein assigning the sequence of tokens to the cluster comprises:
    identifying a sequence of attribute values corresponding to the sequence of tokens, the sequence of attribute values including the at least one attribute value;
    determining that the sequence of attribute values corresponding to the sequence of tokens matches a pattern by which the cluster is characterized by satisfying the at least one merging rule associated with the at least one attribute value; and
    in response to determining that the sequence matches, merging the sequence of tokens with the cluster; and
  outputting a representation of the cluster comprising the sequence of tokens included in the cluster, the cluster indicative of a structure of at least a portion of the data stream.

* * * * *